Dec. 13, 1966     D. C. BURCH ETAL     3,292,133

VEHICLE-PANEL CONNECTOR

Original Filed Sept. 12, 1960

HOUSING-HELD TERMINAL MEANS

HOUSING-HELD MATING TERMINAL MEANS

INVENTORS
Donald C. Burch
Richard E. Trosien
Raymond Helle
Robert C. Woofter

BY *Albert H. Reuther*

Their Attorney

United States Patent Office 3,292,133
Patented Dec. 13, 1966

3,292,133
VEHICLE-PANEL CONNECTOR
Donald C. Burch, Birmingham, and Richard E. Trosien, Dearborn, Mich., Raymond Helle, Warren, and Robert C. Woofter, Cortland, Ohio, assignors to General Motors Corporation, Detroit, Mich., a corporation of Delaware
Original application Sept. 12, 1960, Ser. No. 55,482, now Patent No. 3,146,052, dated Aug. 25, 1964. Divided and this application Mar. 5, 1964, Ser. No. 349,708
2 Claims. (Cl. 339—126)

This is a division of copending application S.N. 55,482, Burch et al., filed September 12, 1960, now Patent No. 3,146,052, Burch et al., issued August 25, 1964, and belonging to the assignee of the present invention.

This invention relates to electrical connections on vehicles and, particularly to terminal and mounting means specifically adapted to establish multiple electric contacts through an apertured panel.

An object of this invention is to provide a new and improved vehicle-panel connector adapted to establish multiple electric contacts through a single aperture of a vehicle panel on opposite sides of which identical terminal means are used and housed in mating insulating body portions.

Another object of this invention is to provide a vehicle-panel connector including a pair of housing portions at least one of which projects through an aperture of a vehicle mounting panel such as a storage compartment wall, dashboard wall, floor board, firewall and the like and which is adapted to mate and interlock with the other housing portion, both the housing portions having terminal means retained therein identical to each other including contacts resiliently engageable in contiguous relation to each other.

Another object of this invention is to provide a vehicle-panel connector means including in combination a vehicle firewall panel having an aperture therein on one side of which one of a pair of housing portions of insulating material is adapted to be fastened in sealing engagement to the firewall panel such that a body of insulating material thereof projects with locking means through the aperture and is engageable by another housing portion that mates with the other housing portion including the locking means for maintenance of electrical contact between pairs of identical terminal means having resilient spring portions in face-to-face contiguous relation.

Further objects and advantages of the present invention will be apparent from the following description, reference being had to the accompanying drawings wherein preferred embodiments of the present invention are clearly shown.

In mass-production of motor vehicles, there is a progressive assembly of various parts and components in a succession of work stations where a predetermined time interval is allowed to fit together or assemble certain parts. In some instances, a vehicle body and a frame or chassis means are subassembled to a predetermined extent prior to being joined along a main assembly line. Wiring means such as insulated harnesses having a predetermined grouping of electrical conductors must be interconnected in predetermined locations such as inside a vehicle body in an engine compartment which is insulated and separated from a passenger compartment of the body.

Figure 1:
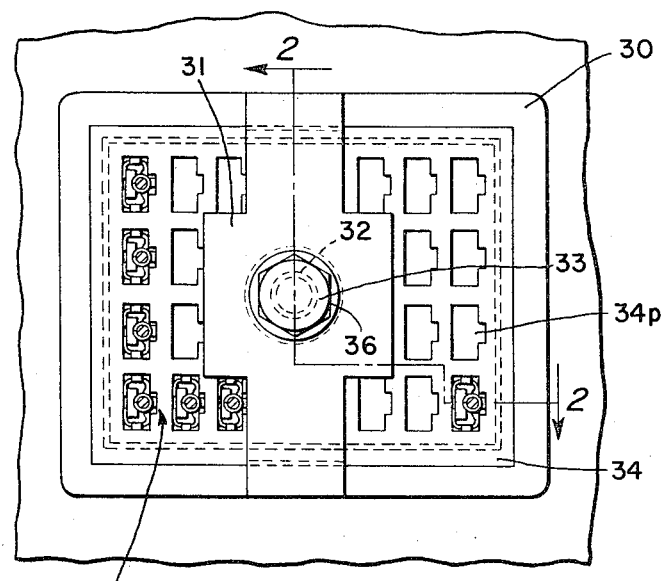
FIGURE 1 is an elevational plan view of a vehicle panel connector means in accordance with the present invention.
Figure 2:
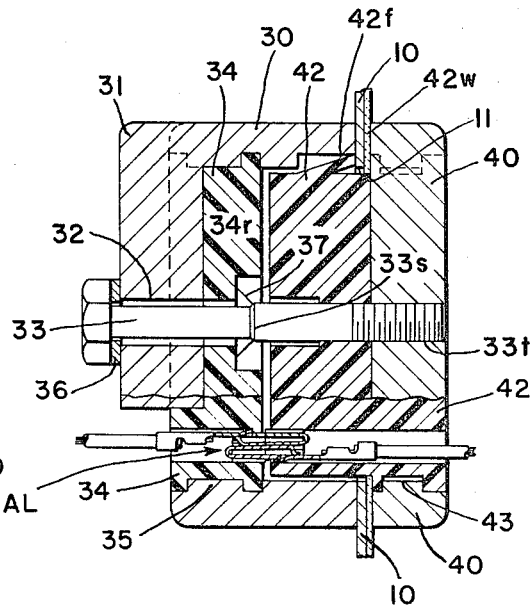
FIGURE 2 is a cross-sectional view taken along line 2—2 in FIGURE 1.

FIGURES 1 and 2 illustrate a vehicle panel connector means providing 20-way connection of mating terminal means fitted into housing portions mountable on opposite sides of a vehicle panel such as 10 having an aperture 11 FIGURES 1 and 2 show a cast metal and plastic housing assembly in which a fastening means such as a through bolt can retain housing components in a fixed position relative to an apertured panel or support. The housing assembly includes a male rectilinear frame portion 30 having a central laterally offset transverse strap or U-shaped member 31 apertured axially at 32 and carrying a threaded stud or bolt 33. A body 34 of insulating material having passages 34p therein is accommodated in complementary fit on one side of the offset strap or member 31 and is retained by a tight dovetail fit over a laterally inwardly extending flange or abutment 35 integral with the frame 30. The bolt 33 has a head adjacent to a washer 36 and a spring fastener 37 with a truncated conical shape fits into a recess 34r so as to engage a shoulder 33s on the bolt and thereby to hold the bolt to the die cast frame 30 and male insulating body 34. The bolt 33 has a threaded end 33t adapted to extend through the aperture 11 and be threaded into a female frame portion 40. A plastic or insulating material housing portion 42 is joined and fitted to a dovetail flange or laterally inwardly extending projection 43 of the frame 40 which combined with the housing portion 42 can be retained in a mounted position relative to the apertured panel 10 by means of an angularly disposed and laterally flexible flange 42f integral with the housing portion 42 of insulating material. The flange 42f is resilient and a washer-like lateral extension 42w is wedged between one side of panel 10 and the frame 40. The bolt 33 can be threaded and tightened so as to hold the frame portion 40 on one side of the panel 10 tightly together with the frame portion 30 on an opposite side while suitable mating terminal means fitted into passages such as 34p in each of the insulating housing portions can mate with each other to provide multiple electrical connections through the aperture 11 of panel 10.

What is claimed is as follows:

1. A vehicle panel connector comprising, a pair of housing portions at least one of which projects through an aperture of a vehicle mounting panel such as a storage compartment wall, dashboard wall, floor board, firewall, and the like, a plurality of terminal means secured in each of said housing portions, all of said terminal means being identical to each other and including contact portions resiliently engaged in contiguous mating relation to each other, at least one of said housing portions including fastening means adapted to interlock said housing portion in place on one of opposite sides of the vehicle panel, each of said housing portions being retained by a frame means and a bolt means carried by said frame means to stay therewith through holding together said frame means and housing portions on opposite sides of the panel, said frame means on one side of the panel having a rectilinear configuration for retention of one of said housing portions and a central laterally offset transverse U-shaped strap-like member through which said bolt means extends from a headed end thereof to a lateral shoulder integral therewith, and a substantially annular spring fastening device fitted onto said bolt means to engage said shoulder thereof for retaining assembled relation with both said housing portion and frame means.

2. A vehicle panel connector comprising, a pair of housing portions at least one of which projects through an aperture of a vehicle mounting panel such as a storage compartment wall, dashboard wall, floor board, firewall, and the like, and a plurality of terminal means secured in each of said housing portions, all of said terminal means being identical to each other and including contact portions resiliently engageable in contiguous relation to each other, at least one of said housing portions including fastening means adapted to interlock said housing portion in place on one of opposite sides of the vehicle panel, each of said housing portions being retained by a cast metal frame means and a bolt means that holds together at least said frame means on opposite sides of the panel, said frame means including male and female rectilinear parts complementary in dovetail fit with respective housing portions each of insulating material, said bolt means having an enlarged headed end and a lateral shoulder in an intermediate location as well as a threaded end, one rectilinear part of said frame means having an integral transverse U-shaped strap-like member through which said bolt means extends from the headed end thereof as well as through one housing portion, and as spring fastening device having a truncated conical shape fitted to engage said shoulder of said bolt means thereby retaining one rectilinear part of said frame means and housing portion therewith for assembly with counterpart housing portion and frame means engaged by the threaded end of said bolt means.

References Cited by the Examiner

UNITED STATES PATENTS

| | | |
|---|---|---|
| 1,932,456 | 10/1933 | Gaston. |
| 2,771,591 | 11/1956 | Vordtriede _____ 339—263 |
| 2,790,153 | 4/1957 | Arson _____ 339—184 |
| 2,891,103 | 6/1959 | Swengel _____ 174—153 |
| 2,911,610 | 11/1959 | Kirk _____ 339—126 X |
| 2,938,190 | 5/1960 | Krehbiel _____ 339—176 |
| 2,964,724 | 12/1960 | Fox _____ 339—92 X |

EDWARD C. ALLEN, *Primary Examiner.*

ALFRED S. TRASK, *Examiner.*